Figure 1:
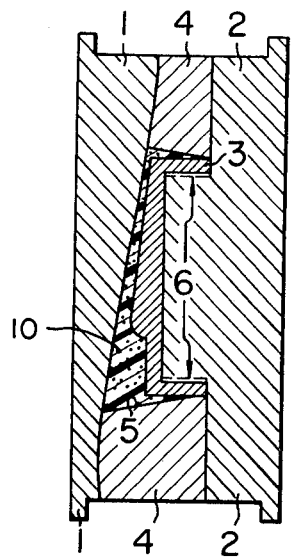

# United States Patent

Wada et al.

[11] 4,073,844
[45] Feb. 14, 1978

[54] PREPARATION OF CROSSLINKED POLYOLEFIN FOAMS AND THE MOLD

[75] Inventors: Motomu Wada, Nagaokakyo; Masakazu Inoue, Ibaragi; Kazunori Furukawa, Takatsuki; Shigeyoshi Matsubara, Settsu, all of Japan

[73] Assignee: Sumitomo Chemical Company, Limited, Osaka, Japan

[21] Appl. No.: 667,137

[22] Filed: Mar. 15, 1976

[30] Foreign Application Priority Data

Mar. 22, 1975  Japan .................................. 50-34820
Apr. 15, 1975  Japan .................................. 50-46246

[51] Int. Cl.$^2$ ............................................. B29D 27/00
[52] U.S. Cl. ...................................... 264/55; 249/82; 264/DIG. 18; 264/DIG. 83; 425/817 R; 425/DIG. 14
[58] Field of Search ............... 264/DIG. 18, DIG. 83, 264/328, 54, 55; 425/DIG. 5, DIG. 14, 817 R; 249/82

[56] References Cited

U.S. PATENT DOCUMENTS

| 2,530,289 | 11/1950 | Cook | 264/DIG. 83 |
|---|---|---|---|
| 3,029,472 | 4/1962 | Fischer | 264/DIG. 83 |
| 3,058,161 | 10/1962 | Beyer et al. | 264/DIG. 83 |
| 3,098,831 | 7/1963 | Carr | 264/DIG. 18 |
| 3,098,832 | 7/1963 | Pooley et al. | 264/DIG. 18 |
| 3,376,238 | 4/1968 | Gregorian et al. | 264/DIG. 18 |
| 3,394,214 | 7/1968 | Benning | 264/DIG. 18 |
| 3,596,318 | 8/1971 | Kyritsis et al. | 425/DIG. 5 |
| 3,923,922 | 12/1975 | Grant | 264/DIG. 83 |

Primary Examiner—Philip Anderson
Attorney, Agent, or Firm—Stevens, Davis, Miller & Mosher

[57] ABSTRACT

In a method for the preparation of crosslinked polyolefin foams by charging a polyolefin or its blend with other thermoplastic resins containing a crosslinking agent, foaming agent and if necessary a filler into the heated mold having a changeable cavity and, after decomposition of the crosslinking and foaming agents, retracting the moving-plate of the mold by a definite distance to increase the cavity and at the same time cooling the mold, an improvement for the preparation of the crosslinked polyolefin foams having excellent appearance and dimensional stability, comprising using a mold of which the moving-plate is constructed with a body and a sliding-piece, the body holding the piece slidably whereby the sliding-piece is left behind owing to sliding between the two even on rapid retraction of the body and then retracts at the rate corresponding to the foaming pressure of the resin, in other words, at a self-controllable rate and the mold for the preparation thereof. Furthermore an improvement using a mold of which the side-plate is constructed with a body and a piece which is freely attachable to or removable from the body, and the mold. And both the sliding-piece and the side-piece are exchangeable in order to change the mode of the molded products.

1 Claim, 6 Drawing Figures

PREPARATION OF CROSSLINKED POLYOLEFIN FOAMS AND THE MOLD

The present invention relates to a method for the preparation of the crosslinked foams of a polyolefin or its blend with other thermoplastic resins by means of an injection molding machine or compression molding machine and the mold for the preparation thereof.

In the well known techniques of this field the foams are prepared by injecting a polyolefin containing a crosslinking agent and a foaming agent into a heated mold by means of an injection molding machine and, after decomposition of the crosslinking and foaming agents, opening the mold to cause the molten resin to expand outward into the foams having a shape similar to the mold cavity. In this technique, however, it is difficult to obtain the foams having a correctly definite size. Therefore, when a correct dimension is required as in the case of a shoe sole a more expensive method has been taken, namely, the polyolefin containing a crosslinking agent and a foaming agent is molded into a plate-like foam by compression molding, sliced and cut into a shape of shoe sole. The sole-shaped, sliced foam pieces are pasted together with adhesive and buffed to clean the surface.

There was considered a method for the preparation of crosslinked polyolefin foams which comprises charging the polyolefin containing a crosslinking agent and a foaming agent into the heated mold having a changeable cavity and, after decomposition of the crosslinking and foaming agents, retracting the moving-plate of the mold by a definite distance to increase the mold cavity and at the same time cooling the mold. In the said method, however, the rate at which the mold cavity increases is determined by the rate of retraction of the moving-plate and therefore when the resin in the mold expands in its volume more slowly than the rate at which the mold cavity increases, undesirable wrinkles appear on the surface of the molded product. In order to overcome the said defects in the conventional processes and to produce the crosslinked foams having excellent appearance and definite size at low cost the present inventors effected various studies and found that use of a slidingpiece which is slidably held by a moving-plate body shows specific effect in the molding of the crosslinked polyolefin foams.

One object of the present invention is to provide a method for producing a crosslinked polyolefin foams having excellent appearance and dimensional stability at low cost. Another object is to provide a mold used for the production of the said crosslinked polyolefin foams. Other objects will be apparent from the following description.

The present invention will be illustrated with reference to the accompanying drawings.

According to the process of the present invention crosslinked polyolefin foams are prepared as follows.

(1) A polyolefin 10 or its blend with other thermoplastic resins containing a crosslinking agent, foaming agent and if necessary a filler is charged into the heated mold having a changeable cavity as shown in FIG. 1 (the cavity 5 being a space surrounded by a fixed plate 1, a sliding-piece 3 which is slidably held by a moving-plate body 2 and a side-plate 4).

Figure 2:
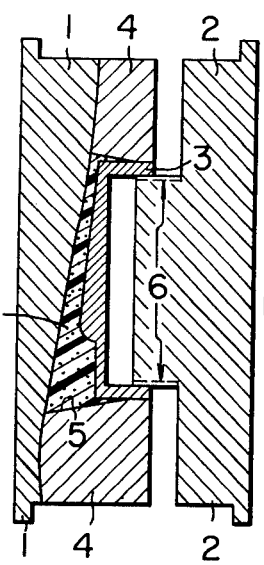

(2) After decomposition of the crosslinking and foaming agents, the body 2 is retracted, as shown in FIG. 2, at the usual rate by the definite distance determined by a desirable expansion ratio. On the other hand, the sliding-piece 3, which is held slidably by the body 2, does not retract together with the body 2, but retracts more slowly to the state as shown in FIG. 3 while increasing the mold cavity at the same rate that the volume of the foaming resin in the cavity 5 increases, in other words, while controlling the retraction rate by itself.

Figure 3:
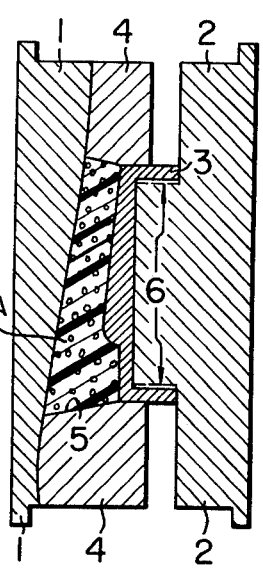
Figure 4:
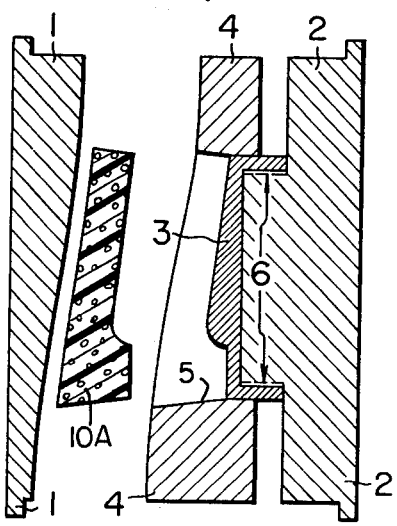

(3) In the state as shown in FIG. 3, the mold is cooled and after the crosslinked foam 10A in the cavity is sufficiently cooled, the mold is further retracted to the state as shown in FIG. 4 in order to take out the molded product.

In this case, it is desirable to cut an air-introducing groove 6 in order to ensure the smooth sliding between the body 2 and the sliding-piece 3.

In the present invention, the retraction rate of the sliding-piece 3 is made self-controllable in order to prevent wrinkles from occurring on the surface of the crosslinked polyolefin foams. If the volume-increasing rate of mold cavity 5 which is exclusively determined by the retraction rate of the mold, is higher than the volume-expanding rate of the foaming resin in the cavity 5, a space appears in the cavity 5 and the crosslinked foam is folded up by the power to expand in the direction perpendicular to the movement of the sliding-piece 3 whereby wrinkles appear on the surface of the crosslinked foam, not giving a good foam.

On the other hand, when the volume-increasing rate of the mold cavity 5 is lower than the volume-expanding rate of the foaming resin, the mold cavity 5 is always filled with the foaming resin whereby the resin is caused to expand toward the direction only of retraction of the sliding-piece 3, thus giving a good foam 10A with no wrinkles on the surface.

In the present invention, the structure of the conventionally used moving-plate is modified so that the plate is constructed with the two parts, a body 2 and a sliding-piece 3, which are free to slide relative to each other. Thus, it becomes possible to prepare the crosslinked polyolefin foams 10A having excellent appearance and dimensional stability with no alteration of the hydraulic mechanism of the common injection molding machines or compression molding machines and with no necessity of controlling the retraction rate of the body 2 each time when the molding conditions are altered.

Figure 5:
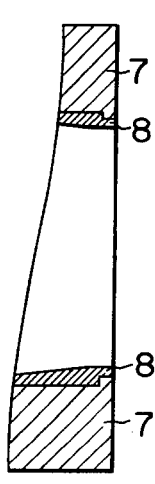

Furthermore, when the side-plate 4 is constructed with the two parts, a body 7 and a piece 8 which is freely attachable to or removable from the body, as shown in FIG. 5, the alteration of the mode of the foamed products becomes very easy by replacing the sliding-piece 3 which is freely attachable to or removable from the moving-plate body and the side-plate piece 8. For example, even the shoe sole of which the mode is frequently changed can easily be prepared.

The crosslinking agent used in the present invention may be any of the peroxides used for cross-linking of polyolefins, for example benzoyl peroxide, dicumyl peroxide, 1,3-di(tert-butylperoxy)diisopropyl benzene and the like. Further, when supply of the already crosslinked polyolefins to the cavity is possible in the case of compression molding machines, the crosslinking may be carried out by means of electron beam or radiation.

The foaming agent may be any of the chemical ones used for foaming of polyolefins, for example azodicarbonamide, N,N'-dinitrosopentamethylene tetramine and the like. Further, a solvent which is impregnated in the resins by certain methods can also be used as a foaming agent.

It is also possible, if necessary, to add a filler including organic fillers such as for example wooden powder, cork powder and thermosetting resin powder, and inorganic fillers such as for example metallic powder, metal salts, metal hydroxides and metal oxides.

The polyolefins used in the present invention include polyethylene and ethylenic copolymers such as ethylene-vinyl acetate copolymer, ethylene-propylene copolymer, ethylene-acrylic acid copolymer, ethylene-acrylic ester copolymer and the like. The polyolefins can be used alone or in blends. It is also possible, if necessary, to blend other thermoplastic resins.

FIGS. 1, 2, 3 and 4 are a sectional view of the mold according to the present invention which is attachable to an injection molding machine or compression molding machine. 1 is a fixed-plate, 2 a moving-plate body, 3 a sliding-piece, 4 a side-plate, 5 a mold cavity and 6 is an air-introducing groove.

FIG. 1 shows the state wherein the material supplied to the mold cavity is under heating. FIG. 2 shows the state wherein the body has just been retracted. In the course from FIG. 1 to FIG. 2, sliding occurs between the body 2 and sliding-piece 3. FIG. 3 shows the state wherein retraction of the sliding-piece 3 has just been completed by expansion of the foaming resin in the mold cavity 5. In the course from FIG. 2 to FIG. 3, sliding occurs between the side-plate 4 and sliding-piece 3, and between the sliding-piece 3 and the moving-plate body 2. FIG. 4 shows the state wherein the foamed product is taken out by detaching the side-plate 4 from the fixed plate 1. FIG. 5 shows the state wherein the side plate 4 is constructed with a side-plate body 7 and a side-plate piece 8 which is freely attachable to or removable from the side-plate body in order to facilitate the alteration of the mode of the foamed products.

Figure 6:
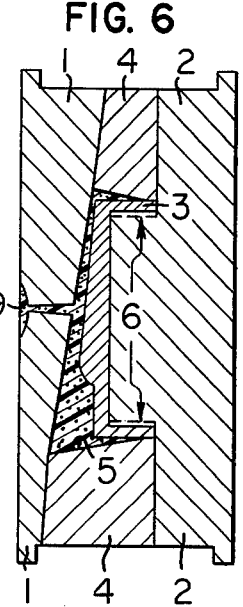

FIG. 6 shows an example of using the mold of the invention in injection-molding A resin is charged through sprue 9 into the cavity 5.

The following examples are given for the purpose of the illustration of the invention and not for the purpose of the limitation.

Examples 1, 2 and 3, and Reference Examples 1, 2 and 3

A compound of 100 parts by weight of ethylene-vinyl acetate copolymer (vinyl acetate content 15%, MI 3), 2 parts by weight of 1,3-di(tert-butylperoxy)diisopropyl benzene (trade name Perkadox ® 14/40) as a crosslinking agent and 3 parts by weight of azodicarbonamide (trade name Cellmic ® C) as a foaming agent, is kneaded uniformly at 80° C on a heated roller. The kneaded compound thus obtained is used as a material.

Examples are carried out using the mold according to the present invention. On the other hand, Reference Examples are carried out using the conventional mold of which the moving-plate is not the one constructed with a body and a sliding-piece.

The kneaded compound as a material is charged at 100° C, by means of an injection molding machine, into the mold which has previously been kept at 180° C. After standing for 2 minutes, the body is retracted at the rate as shown in Table 1 so that the final mold cavity becomes 5 times as large as the original one. After retraction of the sliding-piece is completed (in Reference Examples, after retraction of the moving-plate is completed), the mold is cooled and then the cooled, crosslinked foam in the mold is taken out of the mold. The surface appearance of the resulting foam is observed. The results are described in Table 1.

It is apparent from the table that, even when the retraction rate of the body is of a usual order of 20.0 mm/sec as shown in Example 1, the volume-increasing rate of the mold cavity is of the same order as in Reference Example 3 owing to self-control of the retraction rate of the sliding-piece.

Table 1

| Example No. | Mold | Retraction rate of the body | Surface appearance |
|---|---|---|---|
| Example 1 | the mold according to the present invention | 20.0 mm/sec | foams having a good appearance |
| Example 2 | | 3.0 | |
| Example 3 | | 0.5 | |
| Reference 1 | the conventional mold with no sliding-piece | 20.0 | deep wrinkles observable |
| Reference 2 | | 3.0 | |
| Reference 3 | | 0.5 | foams having a good appearance |

Examples 4 and 5, and Reference Examples 4 and 5

The same material as used in the above Examples and Reference Examples is charged into the mold (Examples are carried out using the mold according to the present invention and Reference Examples using the conventional mold of which the moving-plate is not the one constructed with a body and a sliding-piece). The mold is attached to a compression molding machine and is left for 20 minutes while keeping the temperature of the hot-plate at 180° C. Thereafter, the body is retracted at the rate as described in Table 2. After retraction of the sliding-piece is completed (in Reference Examples, after retraction of the moving-plate is completed), the mold is cooled and then the cooled, crosslinked foam in the mold is taken out of the mold.

The surface appearance of the resulting foam is observed. The results are described in Table 2.

Table 2

| Example No. | Mold | Retraction rate of the body | Surface appearance |
|---|---|---|---|
| Example 4 | the mold according to the present invention | 10.0 mm/sec | foams having a good appearance |
| Example 5 | | 1.5 | |
| Reference 4 | the conventional mold with no sliding-piece | 10.0 | deep wrinkles observable |
| Reference 5 | | 1.5 | small wrinkles observable |

What is claimed is:

1. In a method for the preparation of crosslinked polyolefin foams comprising charging a heated expandable sectioned mold with crosslinkable polyolefin foamable components, said components being in the form of a melt while decomposition of the crosslinking and foaming agents occurs, increasing the size of the mold cavity and simultaneously cooling the mold, while permitting said components to foam the improvement comprising rapidly moving a predetermined distance to permit subsequent enlargement of the mold cavity one section of the mold to which is slidably mounted a sliding piece which is not moved and remains in contact with said charged components and permitting said sliding piece to move said predetermined distance by means of the expanding foam.

* * * * *